Figure 1:
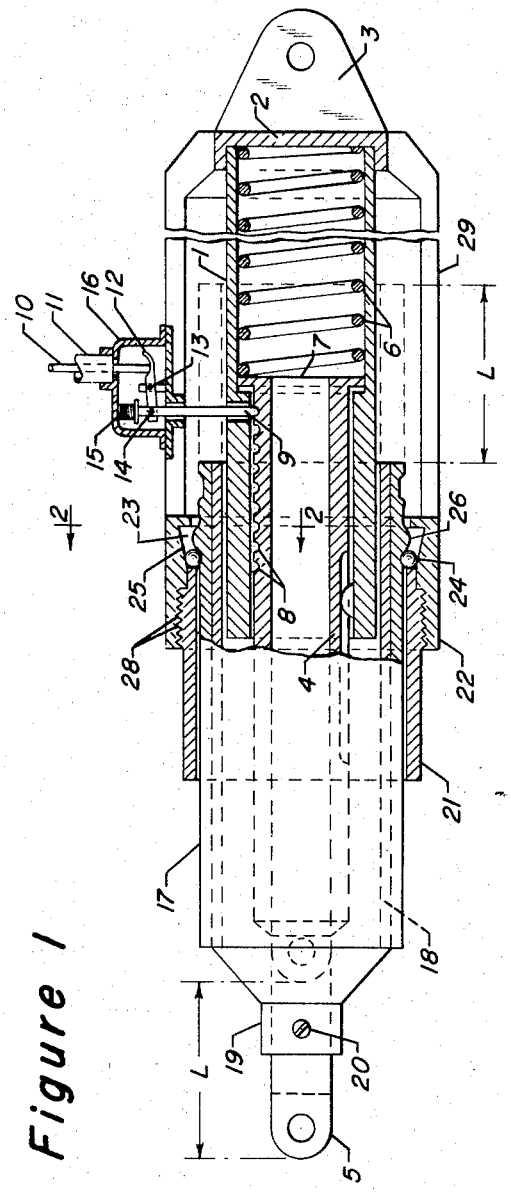

United States Patent [19]
McGregor

[11] 3,758,092
[45] Sept. 11, 1973

[54] POSITION ADJUSTMENT DEVICE WITH DEFORMATION TYPE DAMPER MEANS

[75] Inventor: Eugene R. McGregor, Morris, Conn.
[73] Assignee: Universal Oil Products Company, Des Plaines, Ill.
[22] Filed: Oct. 29, 1971
[21] Appl. No.: 193,644

[52] U.S. Cl. .................................. 267/131, 297/355
[51] Int. Cl. .............................................. F16f 3/02
[58] Field of Search ...................... 267/131, 133, 9; 297/355, 356, 354, 361; 293/60, 72

[56] References Cited
UNITED STATES PATENTS

| | | | |
|---|---|---|---|
| 3,398,986 | 8/1968 | Homier | 297/355 |
| 1,073,161 | 9/1913 | O'Connor | 267/9 C |
| 1,353,514 | 9/1920 | Boswell | 269/9 C |

Primary Examiner—James B. Marbert
Attorney—James R. Hoatson, Jr. et al.

[57] ABSTRACT

A spring-biased mechanical positioning device of the type providing multiple positioning of an extensible-retractable member and compression spring means to effect the return of such member incorporates therewith a special energy absorbing deformation-type damper means to overcome an inherent rapid action return movement from the compression spring means provided in the device. The energy absorbing damper portion embodies the use of a deformable, elastomeric surface on an elongated member and a slidable encompassing ring member with internal tapered ball holding recess means such that the ball means therein can roll freely for one direction of rectilinear movement and, conversely, can depress the ball means into the surface of the elongated member to cause a wave-form resisting force for that direction which resists the expansion force of the compression spring member of the device.

10 Claims, 6 Drawing Figures

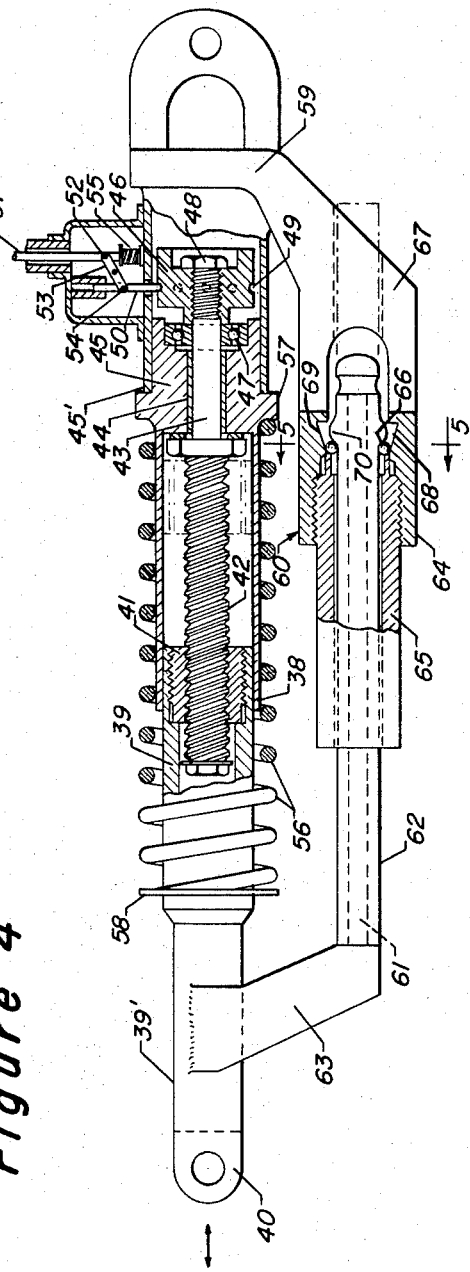
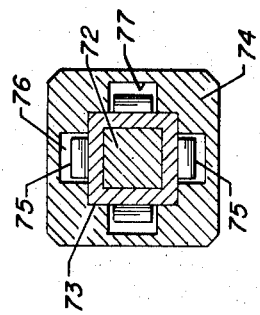
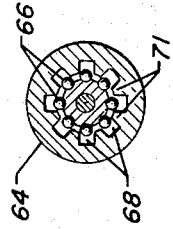

POSITION ADJUSTMENT DEVICE WITH DEFORMATION TYPE DAMPER MEANS

The present invention relates to an improved spring-biased positioning device with a surface deformation type dampening means integrated therewith to overcome the conventionally rapid spring return action existent in such types of devices. More particularly, the improved device provides for the novel combination of a spring-loaded positioning device with a braking or dampening means which, in turn, utilizes ball or roller means in ramped surface recesses such that in one direction of operation there will be a depressing of the rolling means into an elongated elastomeric surface to create a "wave-form" resisting force.

The present improved device is of particular use in connection with reciprocating motions or with pivoted motions, such as for effecting seat back recline adjustment. It is realized that there are many forms and types of seat back adjustment locks, especially in connection with passenger vehicle seats. For example, the airline industry has primarily used hydraulic lock devices for airplane seating because of easy adjustability and quiet operation in either direction. These hydraulic locks use a movable piston and valving means to provide for a fluid to flow through or around the piston member such that it is held in a desired position with the cylinder section of the locks. However, fluid leakage has been a problem with many of these locks and there is resulting high maintenance costs, as well as the possible oil damage to seat upholstry, carpeting, luggage and occasionally passenger clothing.

Mechanical locks can be quite satisfactory for seat back adjustments in one direction (i.e., as there is movement against a spring or other resisting force); but, as will be realized, a spring biased lock or "position adjuster" can result in a too rapid back erecting operation upon the passenger pushing a "release" button. Actually, in connection with vehicular passenger seats, and particularly for airplane seating, where food trays are attached to the seat back, or seat frame, there food trays are attached to the seat back, or seat frme, there is the need to have smooth and controlled seat back movement in each direction so that a seat back will not "flop" or jar the whole seat structure when being brought back to an upright position. Although not a part of the present invention, a preferred seat lock or adjuster device will incorporate means to permit a stewardess or attendant to "dress" or raise all seat backs by merely pushing on them and not resorting to the use of a "release" button. In still another aspect, which feature is embodied in the present invention, there should be at least some energy absorption means in the lock or seat back attachment so that the seat back does not readily move forward during a crash or during any other seat back "breakover" situation.

With respect to "brakes," snubbing means, checks, dampeners, and the like, it is realized that innumerable types and forms are presently known and that various types thereof have been combined with spring biased devices to overcome a released spring action. However, it is not generally known, or believed, that modified types of energy absorbing means which embody the deformation of an elastomeric material have been combined with spring return motions, particularly in connection with seat back adjustment apparatus. Thus, it may be considered a principal object of this invention to provide an improved spring biased position adjusting device which incorporates a movement dampening system that, in turn, provides for the temporary deformation of the surface of an elongated deformable member, whereby there is a continuing resisting force for the full spring return movement of such positioning device.

More particularly, it is an object of the present invention to provide an integrated "one direction" dampener means for a spring-biased locking device that provides for ball or roller means to be pressed into an elastomeric surface of an elongated member whereby a continuing hysteresis effect and "wave-form" resisting force can overcome the expansion force of the spring member being used in the device.

In a broad aspect, the present invention provides for a novel and improved spring-biased positioning device, which is suitable for effecting multiple positioning adjustment to a movable member, to have an integrated surface deforming type dampening means combined therewith such as to resist the rapid spring loaded return movement of a movable portion of the device, such combination comprising, connecting an elongated deformable member with an elastomeric surface to one portion of said device, and connecting a roller-holding sleeve member which slidably encompasses said deformable member to the other portion of said device, said sleeve member in turn having a plurality of spaced internal ramped surface recess means, each of which holds a movable roller means to engage the surface of said deformable member, such ramped recess means being sized with respect to the roller means retained therein to cause the latter to be depressed radially inward into the elastomeric surface of the deformable member as there is rectilinear movement in one direction and, conversely, permit a non-pressuring, free rolling of the roller means upon movement in the opposing direction, and the orientation of said ramped surface recess means in said sleeve member being such as to depress said roller means and provide a wave-form resisting force from the surface of said elongated deformable member as a resistance to the expansion force of the compression spring member of the positioning device.

It is not intended to limit the present invention to any one particular form of mechanical lock, or position adjuster means, except to the extent that the present improved dampening means is especially adapted to overcome the action of a compression spring in turn being used in the device to effect a return of a movable member. For example, the present dampener means may well be integrated with a simple telescoping tube arrangement where the axial or rectilinear movement of one member with respect to the other is against a compression spring means. Also, it is not intended to limit the multiple position adjustment means for the positioning device to any one type of locking mechanism. In other words, retractable pins, tooth and rack means, braking members, and the like, may well be utilized to hold the telescoping movement at a desired position.

Still another form of mechanical lock or positioning device may encompass the use of a "traveling-nut" along with a threaded shaft or, conversely, the use of a fixed position threaded nut and a traveling threaded rod to move through the fixed nut. In other words, various types of means may be utilized to obtain the desired rectilinear movement between extensible-retractable parts. Reference may be made to U.S. Pat. Nos.

3,046,055 and 3,350,135 each of which illustrate and describe one form of position adjusting device which is particularly suitable for seat back adjustment.

With respect to the improved form dampening portion of the present apparatus, which utilizes deformation of an elastomeric surface to in turn provide energy dissipation through hysteresis losses, there are many variations in design and arrangement which might well be utilized in connection with any one mechanical lock means. In certain instances, the dampener means may be integrated or combined with a locking member in a side-by-side arrangement; however, typically, or preferably, the dampening section will be provided around or in axial alignment with the telescoping members of the positioning portion of the device such that the resistant force will be symmetrically and uniformly distributed with respect to overcome a spring action encountered during a return movement of the position adjustment device.

As briefly set forth hereinbefore, the present invention makes utilization of a plurality of small balls, or roller means, to engage a deformable elastomeric surface of an elongated member such that there is a resulting continuing wave resisting force caused by the ball or roller means depressing into the elastomeric surfae during the rectilinear travel. Generally, the plurality of small balls will be utilized to effect the wave-form deformation into the surface of the elongated deformable rod member; however, where a rectangular or polygonal form rod member is used, then there may be provided a plurality of small roller members in lieu of the small spheres. In each case, each ball or roller means will be caged or housed within an individual pocket or recess where there is a sloping or ramped surface above the roller means whereby for one direction of movement the ball or roller means can move freely but, for the reversed direction of movement, will be forced to dig into the elastomeric surface. In the present application, the term "roller means" will be used to apply to either a ball-form member or to a small rod-like roller member. Typically, the balls will be made of steel or other hard material so as to be capable of digging into and deforming the elastomeric surface of the deformable member.

With respect to the elastomeric surface, it may be of a highly elastic nature capable of repeated deformations without undergoing undue wear or any permanent deformation. Typically, such surface will comprise a polyurethane elastomer, polyisoprene, polybutadiene, or generally any of the non-thermo plastic materials unless they have been highly plasticized. Also, various elastomeric rubber compounds may well be utilized, as for example styrene-butadiene rubber, acrylo-nitrile rubber, siclicone rubber, and the like. Actually, any elastomeric surface which can undergo repeated deformations without taking any permanent set can be used. Such materials have the ability to create a wave-form of the material in front of the ball member as it rolls along the surface and thus create the desired resistant force. Presently known types of devices which utilize a principal of this nature have been used in connection with certain special types of dampening means such as for door checks and the like; however, in the present invention there is the utilization of the principal in a construction integrated with a multiple position adjusting device which, in particular, can be utilized with seat back adjusters and the like.

Reference to the accompanying drawings and the following descriptions thereof will serve to illustrate more clearly the present improved combined mechanical positioning-dampening device.

In addition, various of the drawings will illustrate modifications in design and arrangement which may be accomplished through the use of various forms of dampener means in comination with a multiple positon adjustment device.

FIG. 1 of the drawing illustrated diagrammatically a spring biased telescoping tube adjustment means and an encompassing dampener arrangement where an elongated tube with an elastomeric surface connects with one portion of the telescoping positioning adjuster means and the outer ball retaining ring means connects with the other portion thereof.

Figure 2:
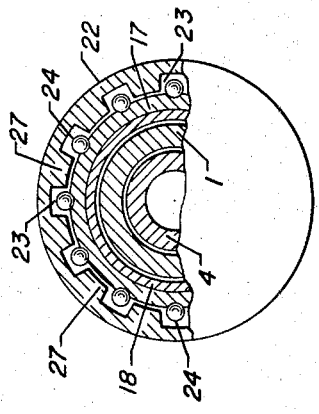

FIG. 2 of the drawing is a partial sectional view through the apparatus of FIG. 1 as indicated by the line 2—2 in the latter figure.

Figure 3:
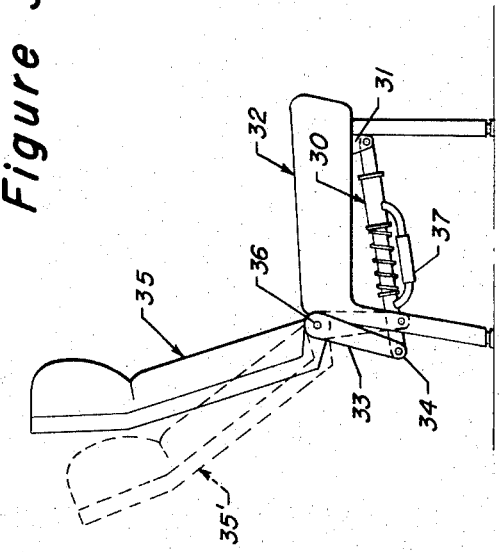

FIG. 3 of the drawing is a diagrammatic illustration of a seat having a movable back and an under-the-seat arrangement where a position adjuster means is utilized in combination with an "along-side" arrangement of dampener in turn utilizing energy absorption through deformation of an elastomeric surface on a movable elongated rod member.

FIGS. 4 and 5 illustrate diagrammatically and in somewhat more detail one arrangement of a spring biased mechanical lock utilizing a traveling nut arrangement together with an integrated dampener means where there is wave-from resisting force generated by an elastomeric surface on a movable rod member, with such rod member being connected to an extensible-retractable moving portion from the lock means, while the ball retaining outer ring section for the dampener means in turn connects with the fixed end portion of the lock means.

FIG. 6 of the drawing indicates in a cross-sectional diagrammatic view a rectangular arrangement having small roller members in an encompassing ring section in lieu of a plurality of ball means which normally encompass a circular deformation rod member.

Referring now particularly to FIGS. 1 and 2, there is indicated in a diagrammatic manner a simple form of telescoping tube position adjuster with an outer tube member 1 having an end cap 2 with bracket or other attachment means 3 whereby the unit may be connected to a support means or to a member which will be subjected to movement. Slidably positioned within outer tubular member 1 there is provided an inner tube 4 with an end connecting means 5 which will be adapted to connect with a movable work piece or other member to be moved with respect to the base or structure in turn connective with bracket 3. Also, internally within outer tube 1, there is shown a compression spring member 6 which is adapted to be held between end cap 2 and a flanged end portion 7 on inner tubular member 4, whereby the latter will be working against the spring means 6 as there is position adjustment inward with respect to outer tubular member 1.

In order to illustrate one form of locking means, there is indicated the provision of a pluraltiy of spaced apart holes or depressions 8 along the surface of inner tube member 4. The holes 8 are adapted to receive a movable pin means 9 which in turn can be operated responsive to a push-button (not shown) and a rod means 10. In other words, the pushing of rod 10 through sheath means 11 will operate a lever 12 supported at pin means 13 such that there is a lifting of rod 9 by reason of pin connection 14. There is also indicated a spring means 15 above movable pin or rod 9 and within a housing means 16 such that there is a normal spring biasing of rod 9 into an appropriate hole 8 in tube member 4. This type of telescoping position adjuster means, utilizing a compression spring biasing means 6, can readily be used to advantage in connection with seat back adjustment systems or with any other arrangement where it is desirable to have a multiple positioning in connection with extensible-retractable operations.

It will, of course, be seen that as inner tube member 4 with inner flange 7 pushes inwardly within tube 1 against spring 6, that there will be a controlled relatively slow movement by reason of the resisting action of spring 6 while, on the other hand, after tube 4 has been telescoped within outer tube 1 and there is to be permitted a return action, or extended movement of tube 4 with respect to tube 1, then spring 6 can exert a rapid expansion force against the inner tube and cause an undesirable and uncontrolled rapid motion for the expanding movement. Thus, in accordance with the present invention, there is provided a deformation type dampening or resisting force available to preclude the rapid expanding action from spring 6. Specifically, there is a continuing deforming action caused on an elastomeric surface 17 of an outer tube member 18 which, in turn, is connected through a tapered sleeve means 19 and bolt means 20 to the outer end portion 5 for inner tube 4. Encompassing tube 18 is a sleeve member 21 and ring member 22 which, in turn, is provided with a plurality of spaced recesses 23, each of which will hold a ball member 24. Each recess or ball holding zone 23 has a sloping, ramped surface 25 which will cause each ball means 24 to be wedged radially inwardly against the elastomeric surface 17 on tubular member 18, as the latter is caused to be extended outwardly with respect to the ring member 22 or with respect to tubular member 1 of the position adjusting section. In other words, as tubular member 18, which is attached to tubular member 4, moves outwardly and each ball member 24 is dragged to the constricted portion of ramped surface 25, there is pressure of each ball member 24 into the surface 17 to cause a resulting continuing wave-form hump or ridge 26 in surface 17 following along ahead of each ball member 24. This waveform deformation in the elastomeric surface provides energy dissipation through hysteresis effect and a continuing resistant force which can efectively overcome the expansion force of spring member 6 and, in turn, provide a desied controlled outward expansion movement of the position adjusting member 4.

As best shown in FIG. 2, each ball member 24 is within a recess 23 by virture of a plurality of spaced partitioning portions 27. It is, however, not intended to limit the present invention to the utilization of any predetermined number of ball means 24 or to any particular size for such ball members inasmuch as the size and number will generally be determined by, or correlated with, the size of the compression spring means 6 and the spring return force which will be exerted by such spring. Typically, there will be a relatively large number of the ball means 24 in individual recesses 23 and such means spaced uniformly around the elastomeric surface of the elongated deformation member such as provided by tube 18 and surface 17. As will hereinafter be set forth, it is to be noted that the dampening means utilizing ball or roller means over an elastomeric surface need not be limited to concentric tubular members over the body of a position adjuster section inasmuch as such means can be in a side-by-side relationship or in an end-to-end axial arrangement, depending upon space conditions or installation requirements.

It is to be realized that the device of FIG. 1 is merely diagrammatic and variations in construction and design as well as in size may well be provided to suit a particular position adjusting operation. For example, the present adjusting means indicates that inner tube 4 together with an outer connective deformable surface on sleeve 18 can travel a distance "L" with respect to outer tube 1 and with respect to the fixed connection end 3. It should also be noted that ring member 22 connects through spaced bar means 29 to the end portion 2 and bracket 3 such that ring member 22 and the enclosed recesses 23 with ball members 24 will be held in a generally fixed location, whereby surface 17 will be traveling longitudinally inwardly and outwardly with respect to ball means 24. Of course, as surface 17 moves in an inward telescoping movement, ball means 24 will move to the enlarged area portion of each recess 23 and there is an unobstructed free movement of the surface on tubular member 18 through ring means 22 along with movement of tube member 4 within outer tube 1. However, conversely, as the outward movement takes place responsive to spring action 6, there is the dragging of each ball means 24 into the constricted portions of each recess means 23 and the resulting multiple deformations of surface 17 and the accompanying waves 26 to cause resisting force for such outward movement.

In FIG. 3 of the drawing, there is merely indicated diagrammatically a position adjuster means 30 being mounted at 31 to a seat base or fixed section on seat 32 and the connection with a bracket or arm member 33 at pivot means 34 such that there can be seat back tilting responsive to movement of seat adjuster means 30. In other words, seat back portion 35 is made connective with arm 33 and pivotable about point 36 whereby inward and outward telescopic movement of adjustable portions of the locking or positioning device 30 will in turn cause desired position adjustments for the seat back 35, from upright positioning to a tilting or recline positioning, such as indicated by dashed lines 35'. There is also indicated in FIG. 3 the utilization of an along-side dampening means 37 in connection with said lock 30, whereby a spring action utilized within lock 30 will be dampened and provided with controlled expansion movement. In accordance with the present invention, the lock or position adjuster 30, which will be of a mechanical and spring-biased type suitable for seat back adjustment may be of any one of a number of mechanical locking types. For example, the lock or positioning portion, as indicated in FIG. 3, may be of a type indicated in FIG. 1 of the drawing or of any other extensible-retractable design which utilizes compression spring biasing to effect the expanding return action force within the device.

For purposes of illustrating variations, a different type of position adjuster mechanism is illustrated in FIG. 4 of the drawing, with such position adjuster means utilizing the principal of a traveling threaded nut on an accompanying rotatable threaded rod. Specifically, with respect to FIG. 4, there is shown an outer tubular-form house member 38 and an inner slidably movable tubular member 39 which is permitted to move back and forth in a telescopic manner responsive to force exerted on the end of tube member 39 at bracket or c'evis connector means 40. Diagrammatically, there is indicated an internally threaded nut 41 held within the inner end portion of tube member 39 and adapted to move rectilinearly along threaded rod 42. Preferably, threading within nut 41 and externally on rod 42 will be of a steep nature in order that the axial pushing of the thread nut 41 will readily turn rod 42 and move therealong in a low-friction manner. Specifically, in this instance, the rectilinear movement of tube 39 and nut 41, which will cause the rotatable movement of rod 42, will also rotate connecting shaft member 43 in a bushing member 44 in turn held within a portion of the end housing section 45.

In connection with movable threaded shaft or traveling nut arrangements, where there is to be position adjustment and locking means, there may be various types of brake means or lock means utilized to hold at least one of the movable parts and effect a desired locked position. In this embodiment, there is indicated diagrammatically the use of a rotating drum member 46 around an end portion of shaft member 43 to provide a locking means. The durm means 46 is positioned beyond a roller bearing 47 and is held to the shaft 43 by threaded nut 48. The circumferential surface of drum 46 is, in turn, provided with a plurality of holes or indentures 49 adapted to receive a movable pin member 50 and thus provide a lock arrangement. Various means may be made for raising or lifting pin member 50 as may be desired to make changes in telescopic relationship between tube member 39 and outer tube 38. However, in the present diagrammatic drawing, there is shown rod means 51 connecting at 52 with a rocker arm member 53 which, in turn, connects at 54 with pin member 50 such that the latter may be rasied responsive to an inward pushing action of rod 51. A small compression spring 55 at the inner end of rod 51 provides for the spring biasing of the lever arm 53 and pin 50 into one of the plurality of recesses 49. Externally around both the outer sleeve 38 and innner tubular member 39, there is positioned a compression spring 56 which is held between outwardly extending flange portions 57 and 58 such that an inward telescoping movement of tube 39 will cause a compression action on spring 56 and a resulting resisting force as inward positioning adjustments are made for the rectilinear relationship between tube members 38 and 39. Conversely, as there are outwardly extending positionings made between tube members 38 and 39, there will be the expansion action of spring member 56 urging a normal rapid outward movement of tube member 39 except for the operation of dampening means as provided by the along-side dampener means 60.

In this embodiment, there is an elongated bar or rod member 61 with a deformable elastomeric surface 62 that connects through attachment bracket means 63 to an outer end portion 39' of tubular member 39. There is also an outer ring member 64 connective with an elongated sleeve portion 65, which slidably encompasses surface 62, whereby a plurality of ball members 66 can be retained to work against and deform the surface 62 through a wave-form resisting force action, in the manner set forth in connection with the description of FIG. 1. Specifically, in the present arrangement, ring member 64 connects through attachment bracket means 67 to an end connector portion 59 on housing portion 45' in turn encompassing rotatable drum portion 46. Thus, ring portion 64 with ball means 66 and spaced recesses 68 will be held in a longitudinally fixed position along with outer tubular member 38 and connector means 59 while the rod member 61, with elastomeric surface 62, will move longitudinally and rectilinearly within ring 64 along with the longitudinal and rectilinear motion of tubular member 39. Each recess 68 within ring member 64 will have a sloping wall or ramped surface 69 so as to provide pressure for each ball member 66 against surface 62 as the latter moves longitudinally outwardly with respect to ring member 64 and, conversely, will provide non-deforming, free rolling space for each ball member 66 as the deformable surface rod member 61 moves inwardly with respect to ring member 64.

In each case, the sizing of the recesses 68, the slope for each surface 69, and the sizing of the plurality of ball means 66 will be such as to permit the free rolling of each ball or, alternatively, to cause a wedging thereof and deformation into elastomeric surface 62 whereby a plurality of waves, such as 70, can serve to assist the spring action of compression spring means 56 during all expansible movements of the positioning adjusting section of the device.

The apparatus of FIG. 4 is of specific advantage in being utilized in connection with seat back adjustment means, such as indicated for the lock or position adjusting means 30 in FIG. 3 of the drawing. However, other position adjusting uses may well be found for this type of unit.

Further, it should be realized that the construction and arrangement of FIG. 4 is merely diagrammatic and not in any way intended to be limiting as to the only construction of a traveling-nut type of position adjuster or as to the only braking or locking means which can be used to effect the holding of a desired position. The along-side arrangement of the dapening means in combination with the position adjusting section is also diagrammatic and is not intenedred to be in any way limiting inasmuch as concentric or end-to-end relationships may be used and are generally preferred in order to provide more uniform dampening action in overcoming large compression spring forces.

FIG. 5 of the drawing is illustrative of a cross-sectional view, as along line 5—5 in FIG. 4, and better shows that each ball member 66 is retained within its own separate ramped surface recess by virtue of a plurality of partitioning means 71 being provided between the spaces 68 for each ball means. As hereinbefore set forth, each ball should be constructed of a relatively hard material such as steel, or other hard metal, although hard "plastic" materials might be usable, whereby there can be the ready deformation of the elastomeric surface on the elongated deformable member being arranged to move inwardly and outwardly with respect to the ball members in the encompassing ring.

Also, as hereinbefore noted, the elastomeric surface in each instance should be readily deformable from the pressure of each ball means; however, it should not be of a material that will take a permanent set. Typically, the rod or tube with the elastomeric surface will be of a circular corss-section and a plurality of spaced balls will be used in encompassing spaced recess means.

However, the wave-form resisting force on an elastomeric surface can be made in connection with small rod-type roller means rather than from spherical ball means and the elastomeric surface could well be made on a bar or tube of rectangular form, or of other polygonal form.

Reference to FIG. 6 of the drawing indicates diagrammatically how a square or rectangular form bar 72, with elastomeric surface 73, can be encompassed within a rectangular form ring or housing 74 which in turn is adapted to hold small roller means 75 within recesses 76. Each recess 76 will in turn have a ramped or sloped surface 77 to be above each roller means 75 and provide for the pressuring of each roller means into surface 73 or, conversely, permit space for the free rolling of each roller member 75 for the opposite movement of surface 73 through ring portion 74.

Still other configurations of deformable members and various designs for encompassing ring members may be devised within the scope of the present invention; however, those that have been illustrated are believed to be indicative of the fact that differenet designs and arrangements can be made within the scope of the present invention. Also, where desired, arrangements can be made whereby the ring member moves along with a movable positioning member and with respect to the elastomeric surface although it is generally preferable to have the deformable surface effect movement with respect to a fixed position encompassing ring which holds the spaced balls and sloped surface recesses.

I claim as my invention:

1. In combination with a spring-biased positioning device suitable for providing multiple position adjustment to a movable member and a compression spring is provided to effect a return movement for an extensible-retractable portion of such device, the improved construction and arrangement for dampening the spring loaded return movement of the movable portion of said device, which comprises, an elongated elastomeric surfaced deformable member connected to one portion of said device, and connecting a roller-holding sleeve member which slidably encompasses said deformable member to the other portion of said device, said sleeve member in turn having a plurality of spaced internal ramped surface recess means each of which hold a roller means to engage the surface of said deformable member, such ramped recess means being sized with respect to the roller means retained therein to cause the latter to be depressed radially inward into the elastomeric surface of the deformable member as there is rectilinear movement in one direction and, conversely, permit a non-pressuring, free rolling of the roller means upon movement in the opposing direction, and the orientation of said ramped surface recess means in said sleeve member being such as to depress said roller means and provide a wave-form resisting force from the surface of said elongated deformable member which resists the expansion force of the compression spring member of the positioning device.

2. The positioning device of claim 1 further characterized in that said extensible-retractable portion thereof is adapted to telescope with respect to an adjacent tubular member and a compression spring is utilized to provide an extending movement between such portions.

3. The positioning device of claim 1 further characterized in that a threaded-nut member and a threaded rod member are in a threaded engagement with one another, whereby one of such threaded members may be extensible and retractable with respect to the other, and said compression spring is positioned between said members in a manner to assist in an extending movement therebetween.

4. The positioning device of claim 1 further characterized in that both the elastomeric surface deformable member and the encompassing roller-holding sleeve member are concentrically arranged around the extensible-retractable portion of such device.

5. The positioning device of claim 1 further characterized in that both the elastomeric surface deformable member and the encompassing roller-holding sleeve member are in a side-by-side arrangement with respect to the extensible-retractable portion of such device.

6. The positioning device of claim 1 further characterized in that said roller means within said ramped surface recess means comprises spherical-shaped ball means of a hard material capable of engaging and deforming the elastomeric surface of the elongated deformable member.

7. The positioning device of claim 1 further characterized in that said roller means within said ramped surface recess means are small rod-shaped rollers of a hard material capable of engaging and deforming the elastomeric surface of the elongated deformable member which is of a polygonal corss-section.

8. The positioning device of claim 1 further characterized in that such device is connected between a fixed base portion of a seat and a movable member of a movable seat back adjusting system, whereby there is multiple position adjustment for the back of such seat.

9. A spring-biased seat back positioning device having a surface deforming type of dampening means integrated therewith suitable to resist a compression spring return movement of at least one extensible-retractable member which comprises in combination, a first member for attachment to a non-movable portion of a seat, a second member rectilinearly movable relative to the first member and having means for attachment to a movable seat back member, with one member having a non-rotating threaded part and the other of said members rotatably carrying a part having threading to cooperate with the fixed threaded part, the threading of such parts being sufficiently steep that axial force between members will cause a rotation of the rotatable part and travel of one such part, a locking means connected to at least one threaded part to preclude rectilinear movement between said members, a compression spring member positioned between said first and second members in a manner to urge an extended relative positioning of such member, an elongated deformable member with a deformable elastomeric surface connected to one of first said members, a roller-holding sleeve member which slidably encompasses said elongated deformable member and connects to the other of said first said members, said sleeve member having internal ramped surface recess means therein in turn holding roller means for engaging the surface of said deformable member, such ramped surface recess means being sized with respect to the roller means retained therein to cause the latter to be depressed radially inward into the elastomeric surface of the deformable member as there is rectilinear movement in one direction and, conversely, permit non-depressed free rolling of the roller means upon movement in the opposing direction, and orientation of the slope of said ramped surface recess means in said sleeve member with respect to said compression spring member being such as to depress said ball means and provide a waveform resisting force from the surface of said elongated deformable member which resists the expansion force of the compression spring member in the positioning device.

10. The device of claim 9 further characterized in that both the elastomeric surface deformable member and the encompassing roller-holding sleeve member are concentrically arranged around the extensible-retractable portion of such device.

* * * * *